United States Patent
Shin et al.

(10) Patent No.: US 12,551,828 B2
(45) Date of Patent: Feb. 17, 2026

(54) METHOD FOR EXTRACTING MICROVESICLES FROM BIOLOGICAL SAMPLE

(71) Applicant: Korea University Research and Business Foundation, Seoul (KR)

(72) Inventors: Se-Hyun Shin, Seoul (KR); Ho-Yoon Lee, Seoul (KR); Won-Hwi Na, Seoul (KR); Jin-Hyun Kim, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 798 days.

(21) Appl. No.: 17/430,429

(22) PCT Filed: Feb. 12, 2020

(86) PCT No.: PCT/KR2020/001987
§ 371 (c)(1),
(2) Date: Aug. 12, 2021

(87) PCT Pub. No.: WO2020/166978
PCT Pub. Date: Aug. 20, 2020

(65) Prior Publication Data
US 2022/0111318 A1 Apr. 14, 2022

(30) Foreign Application Priority Data
Feb. 14, 2019 (KR) .................. 10-2019-0017053
Feb. 12, 2020 (KR) .................. 10-2020-0017213

(51) Int. Cl.
*B01D 37/03* (2006.01)
*B01D 15/36* (2006.01)
*B01D 61/16* (2006.01)

(52) U.S. Cl.
CPC ........... *B01D 37/03* (2013.01); *B01D 15/362* (2013.01); *B01D 61/16* (2013.01);
(Continued)

(58) Field of Classification Search
CPC ...... B01D 37/03; B01D 15/362; B01D 61/16; B01D 2311/04; B01D 2311/12;
(Continued)

(56) References Cited

U.S. PATENT DOCUMENTS 5,000,854 A * 3/1991 Yang ................... A61B 5/153
210/257.2
2010/0190210 A1 * 7/2010 Arunakumari ......... C07K 16/30
435/69.6
(Continued)

FOREIGN PATENT DOCUMENTS

CA 2883463 A1 * 3/2014 ............ B01L 3/0275
JP 2005-531304 A 10/2005
(Continued)

OTHER PUBLICATIONS

Siewert, Biomaterials, Investigation of charge ratio variation in mRNA—DEAE-dextran polyplex delivery systems (Year: 2018).*
(Continued)

*Primary Examiner* — Ekandra S. Miller-Cruz
(74) *Attorney, Agent, or Firm* — NSIP Law

(57) ABSTRACT

The present invention relates to a method for extracting microvesicles from a biological sample, the method comprising the steps of: adding a polyvalent cationic material to the biological sample to form an aggregate in which the microvesicles and the polyvalent cationic material are aggregated by electrical force; capturing the aggregate by a capture filter while the biological sample including the aggregate passes through the capture filter; and extracting the microvesicles by allowing an elution solution to pass through the capture filter with the aggregate captured therein to isolate the microvesicles from the aggregate. Accordingly, microvesicles may be extracted using a polyvalent cationic material, without a centrifugation process.

16 Claims, 13 Drawing Sheets

(52) U.S. Cl.
CPC ...... *B01D 2311/04* (2013.01); *B01D 2311/12* (2013.01); *B01D 2311/2642* (2013.01)

(58) Field of Classification Search
CPC ................ B01D 2311/2642; B01D 29/05; B01D 21/01; B01L 3/5023; B01L 2200/0652; B01L 2300/0681; B01L 2300/0832; B01L 3/00; B01L 2300/12
USPC ........................................... 210/691
See application file for complete search history.

(56) References Cited

U.S. PATENT DOCUMENTS

| | | | | |
|---|---|---|---|---|
| 2015/0125212 | A1* | 5/2015 | Fischmann | E02B 15/06 405/63 |
| 2015/0330879 | A1* | 11/2015 | Mai | G01N 1/4077 422/69 |
| 2018/0119131 | A1* | 5/2018 | Max | C12N 15/1006 |
| 2020/0164284 | A1 | 5/2020 | Gho et al. | |

FOREIGN PATENT DOCUMENTS

| | | |
|---|---|---|
| KR | 10-2008-0111487 A | 12/2008 |
| KR | 10-2014-0064735 A | 5/2014 |
| KR | 10-1495631 B1 | 2/2015 |
| KR | 10-2019-0012130 A | 2/2019 |
| WO | WO 2017/178472 A1 | 10/2017 |

OTHER PUBLICATIONS

International Search Report issued on Mar. 4, 2021 in counterpart International Patent Application No. PCT/KR2020/001987 (3 pages in English and 2 pages in Korean).

Konoshenko, Maria Yu et al., "Isolation of Extracellular Vesicles: General Methodologies and Latest Trends," BioMed Research International, 2018, pp. 1-28.

Extended European Search Report issued on Oct. 31, 2022, in counterpart European Patent Application No. 20754903.1 (7 Pages in English).

Konoshenko, Maria Yu, et al. "Isolation of Extracellular Vesicles: General Methodologies and Latest Trends." BioMed research international 2018 (2018), (28 pages in English).

Chinese Office Action issued on Mar. 29, 2023, in counterpart Chinese Patent Application No. 202080024409.0 (4 pages in Chinese).

Chinese Office Action issued on Sep. 1, 2022, in counterpart Chinese Patent Application No. 202080024409.0 (10 pages in Chinese).

* cited by examiner

[FIG. 1]
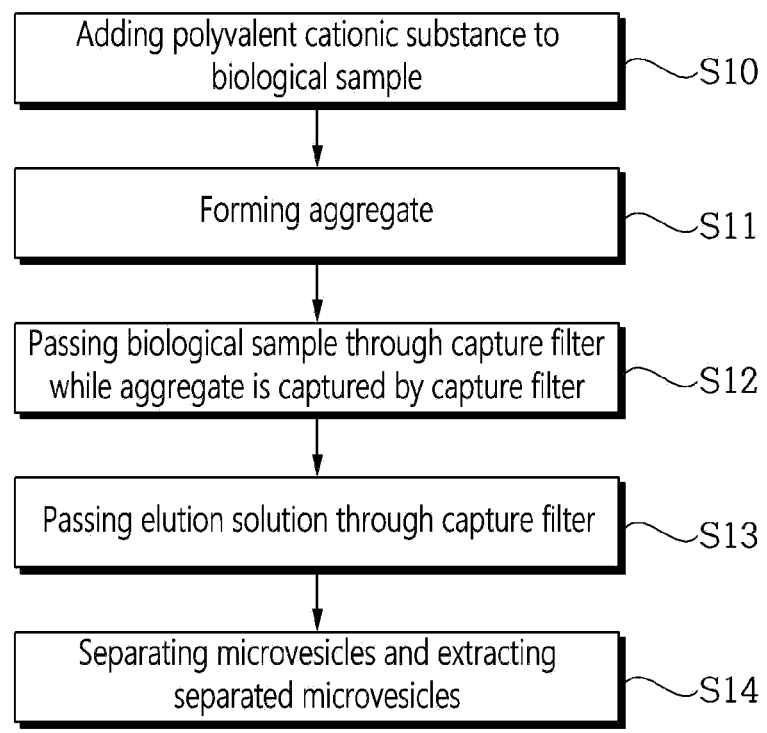

[FIG. 2]
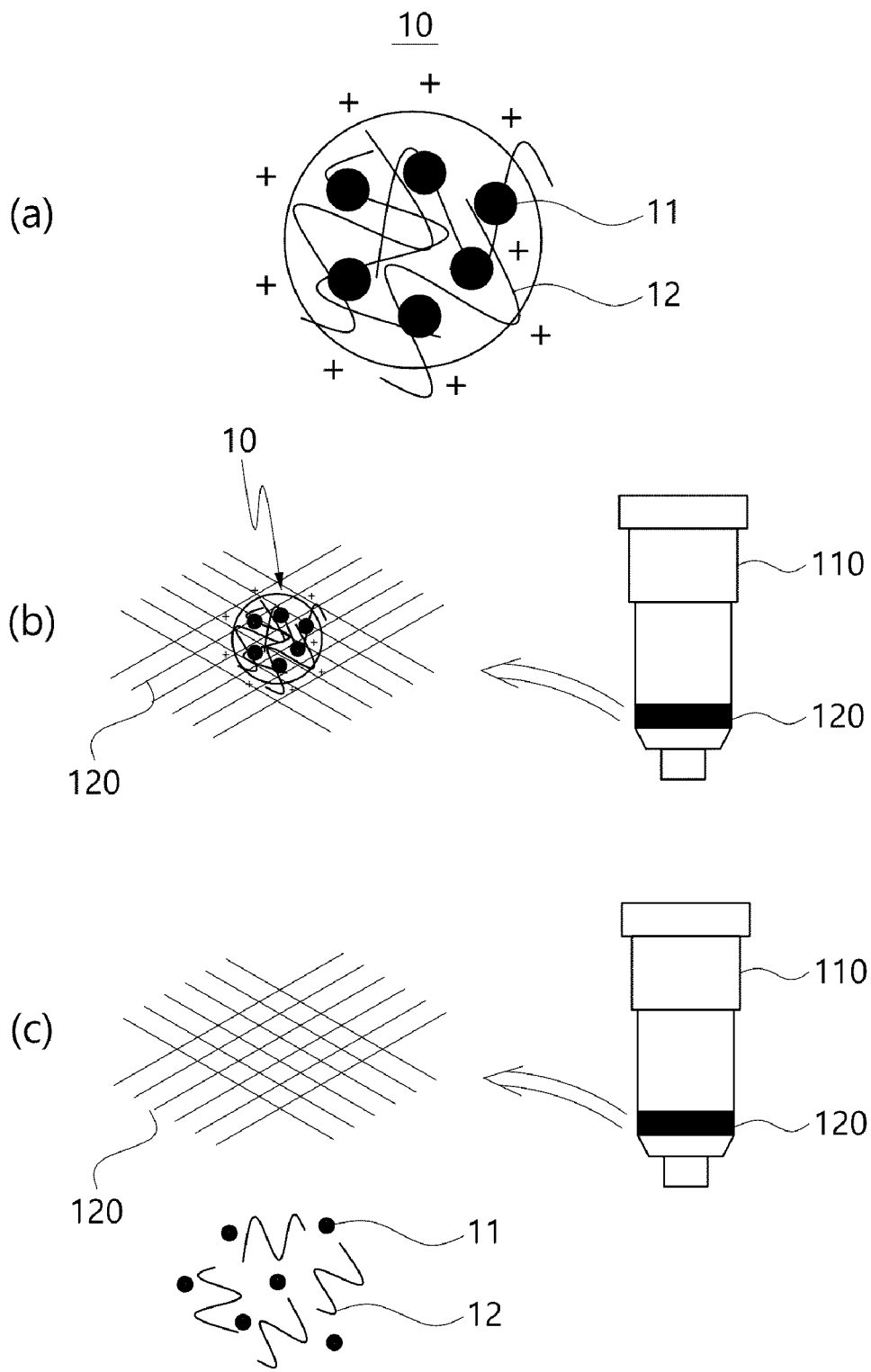

[FIG. 3]
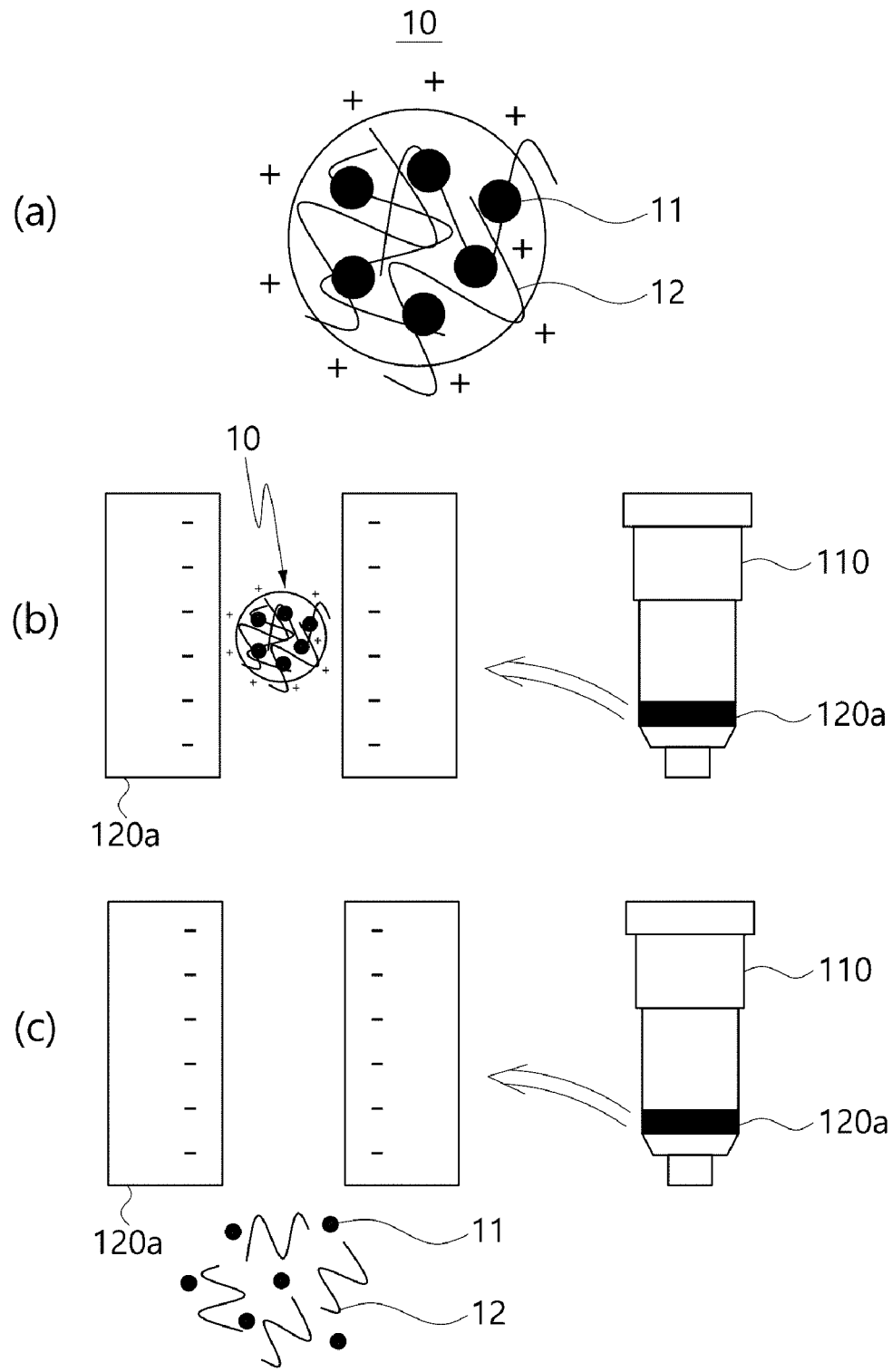

[FIG. 4]
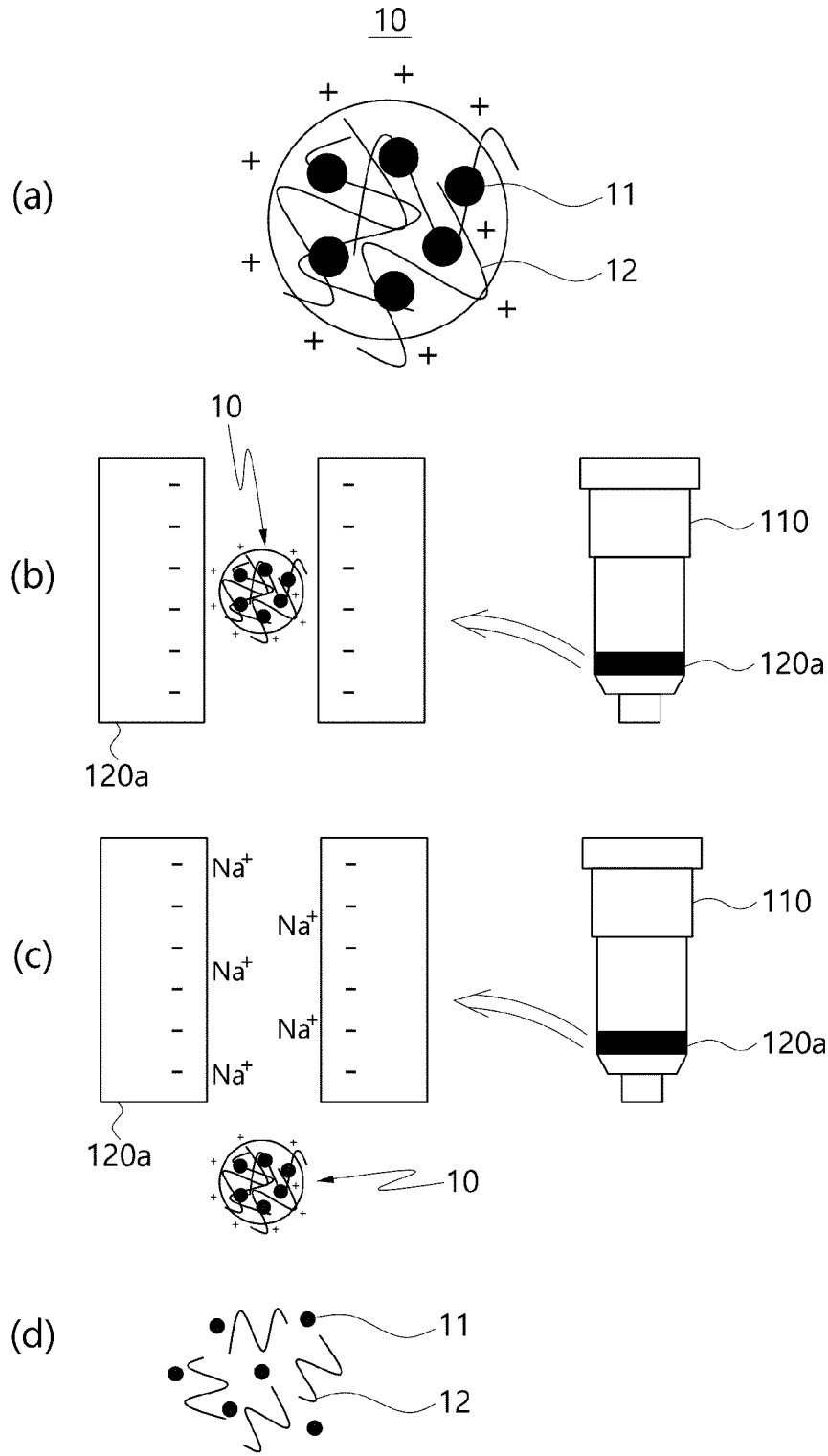

[FIG. 5]
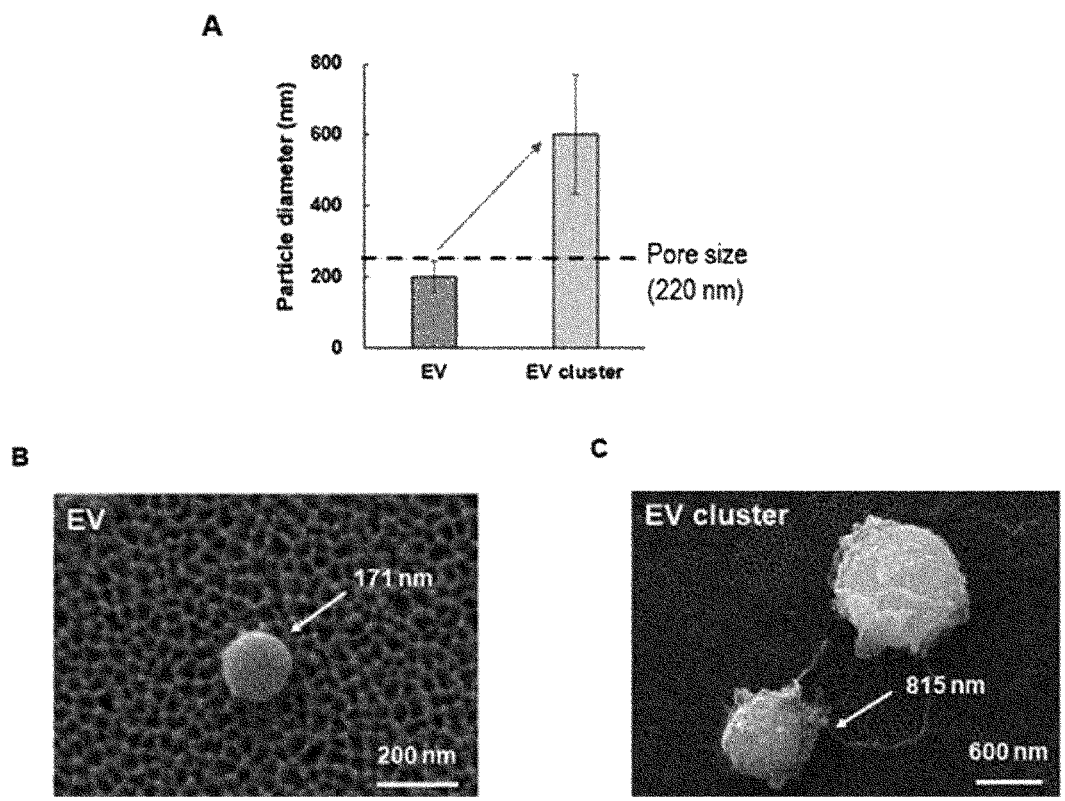

[FIG. 6]
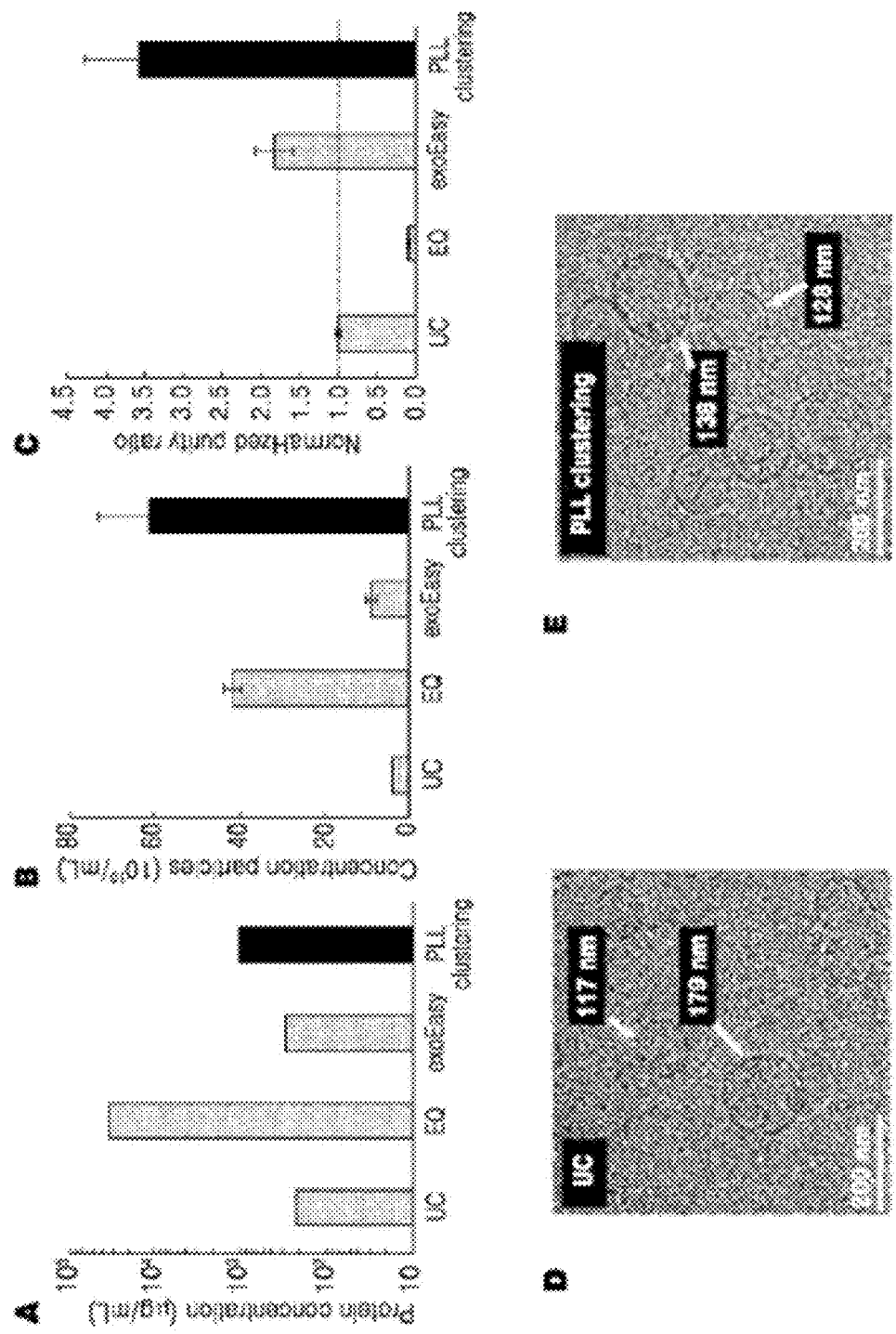

[FIG. 7]
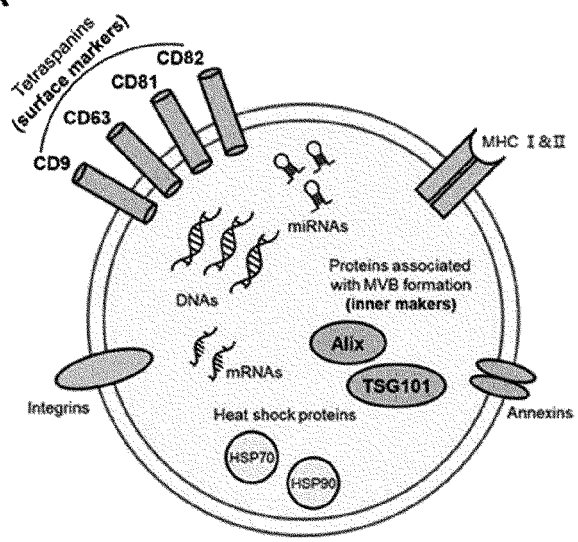
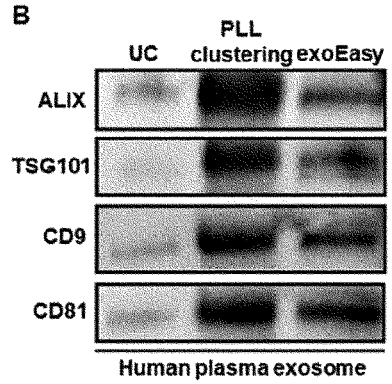
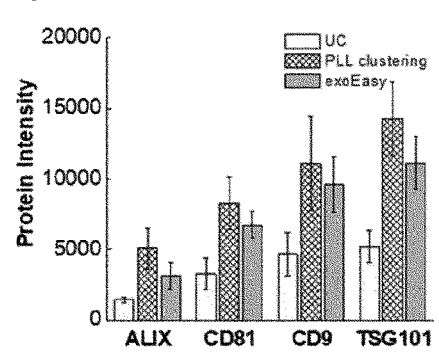
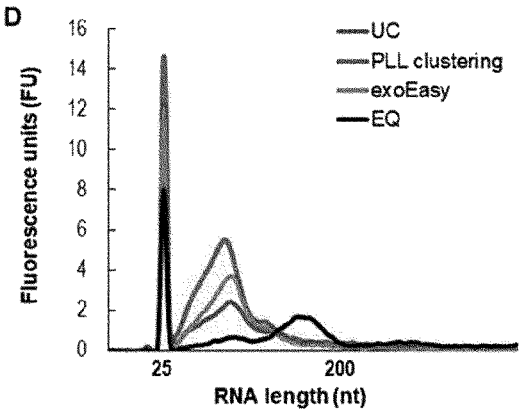
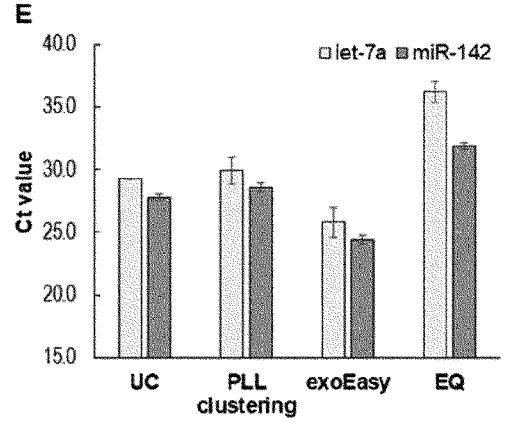

[FIG. 8]
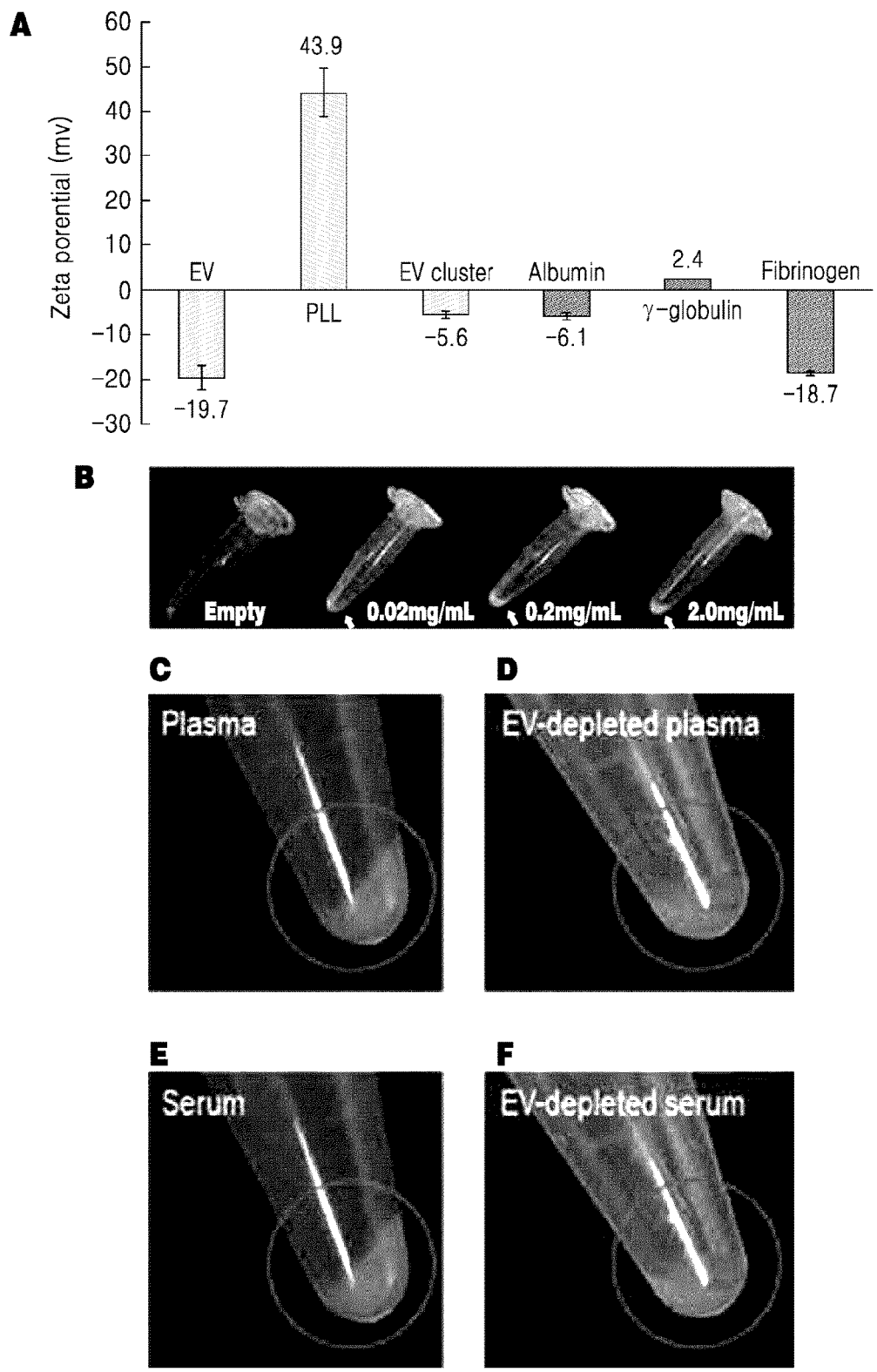

[FIG. 9]
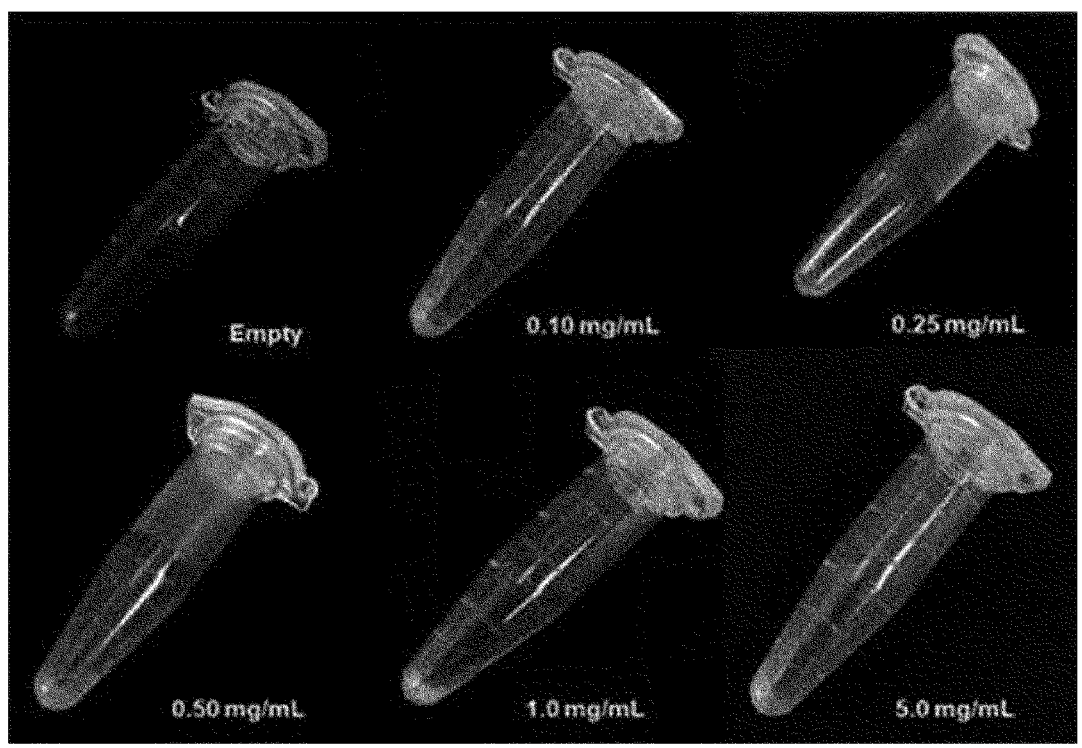

[FIG. 10]

[FIG. 11]
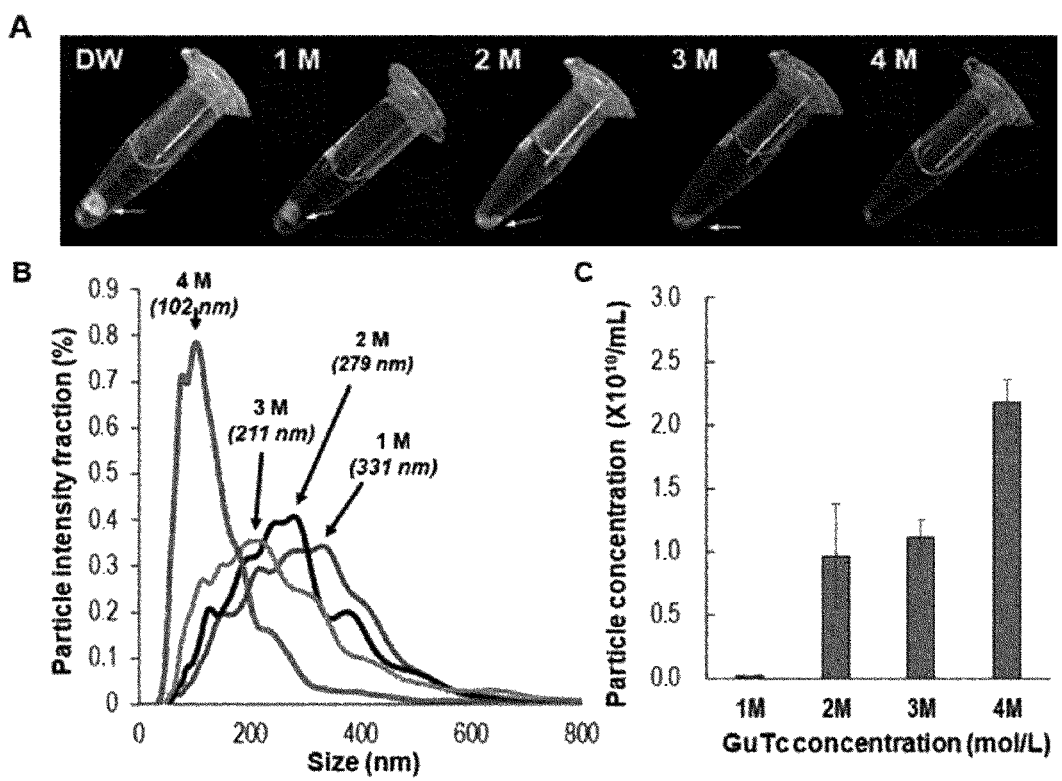

[FIG. 12]
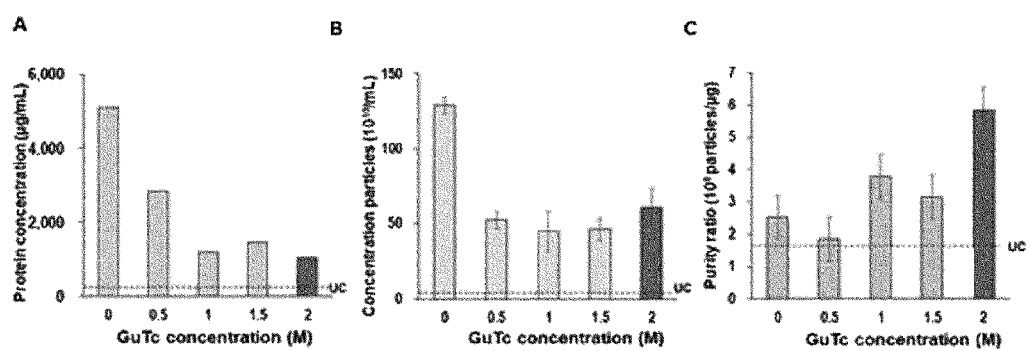

[FIG. 13]
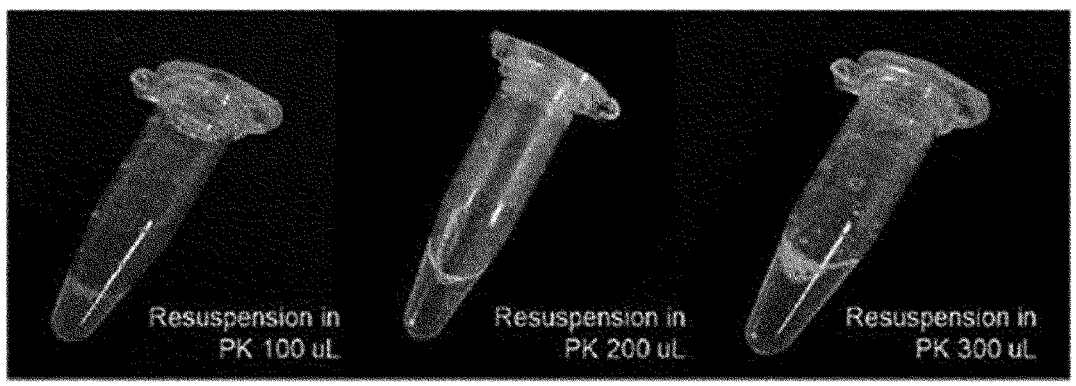

METHOD FOR EXTRACTING MICROVESICLES FROM BIOLOGICAL SAMPLE

CROSS REFERENCE TO RELATED APPLICATION(S)

This application is a U.S. National Stage Application of International Application No. PCT/KR2020/001987, filed on Feb. 12, 2020 and published as WO 2020/166978 on Aug. 20, 2020. This application and PCT/KR2020/001987 claim the benefit under 35 USC 119(a) and 365(b) of Korean Patent Application Nos. 10-2019-0017053 filed on Feb. 14, 2019 and 10-2020-0017213 filed on Feb. 12, 2020 in the Korean Intellectual Property Office. The disclosures of PCT/KR2020/001987 and Korean Patent Application Nos. 10-2019-0017053 and 10-2020-0017213 are incorporated herein by reference.

FIELD

The present disclosure relates to a method for extracting microvesicles from a biological sample. More specifically, the present disclosure relates to a method for extracting microvesicles from a biological sample in which the method may extract microvesicles using a polyvalent cationic substance without a centrifugation process.

RELATED ART

In vivo microvesicle refers to a small vesicle having a membrane structure which exists in various types of cells or is secreted from the cell. Microvesicles secreted out of the cell include exosomes, shedding microvesicles (SMVs), and apoptotic blebs. In this connection, exosomes are membranous vesicles with a diameter of 30 to 100 nm and of phagocytic origin, shedding microvesicles are large membranous vesicles with a diameter of 50 to 1000 nm which are shed directly from a plasma membrane. The apoptotic bleb refers to a vesicle with a diameter of 50 to 5000 nm which are shed from dying cells.

Such in vivo microvesicles, for example, exosomes, are tens of nanometer-sized vesicles secreted from cells and have a structure in which proteins and RNA generated in the cytoplasm or cells are contained in a lipid bilayer or a lipid monolayer.

The exosomes act as means for communication between cells via exchange of proteins and RNA, and is responsible for discharge of unnecessary substances in cells. The exosome contains microRNA (miRNA) and thus is expected to be used as a useful marker for molecular diagnosis such as early diagnosis of diseases such as cancer.

However, although the importance and value of the in vivo microvesicles have been revealed as described above, there are many difficulties in extracting the microvesicles because they have a very small size on the order of nanometers.

Conventional techniques for isolating microvesicles include ultracentrifugation isolation, size exclusion, immunoaffinity isolation, microfluidics chip and a polymeric method.

Among the above conventional methods, the ultracentrifugation isolation method is the most widely used method for isolating the microvesicles, and is recognized as the most reliable method as well as having the simple principle itself.

However, in isolating the microvesicles using the ultracentrifugation isolation method, a yield of microvesicles is low. Isolating the microvesicles takes a lot of time, for example, 8 hours or more.

Further, in the ultracentrifugation isolation method, a centrifuge that may rotate at 100,000 to 200,000 RPMs should be used. When the centrifuge used in a general laboratory rotates at 5,000 to 10,000 RPMs, an expensive centrifuge must be used in the ultracentrifugation isolation method.

The size exclusion method is mainly used together with the ultracentrifugation isolation method and has the advantage of increasing the purity of microvesicles. Due to the phenomenon in which microvesicles stick to a filter, the yield is lowered in the size exclusion method. The size exclusion method should be used together with the ultracentrifugation isolation method.

The immunoaffinity isolation method is intended for isolating microvesicles by attaching antibodies to microvesicles. The immunoaffinity isolation method isolates specific microvesicles at very high selectivity. However, extraction efficiency is low because there is no antibody universally applicable to general microvesicles. Further, since the antibody production process takes a long time and costs a lot, the immunoaffinity isolation method is not suitable for practical diagnosis.

Further, in the polymeric method using a polymer, the microvesicles settle down by adding PEG (polyethylene glycol) to a sample to lower the solubility thereof. In this method, the sedimentation efficiency may be improved using a centrifugal separator. However, an inspection cost is high because the centrifugal separator is used. The purity of the sediment is lowered because impurities such as EV settle down together. This method is not suitable for use for diagnosis.

Disclosure

Technical Purpose

Accordingly, the present disclosure has been devised to solve the above problems. Thus, a purpose of the present disclosure is to provide a method for extracting microvesicles from a biological sample in which the method may extract microvesicles using a polyvalent cationic substance without a centrifugation process.

Technical Solution

The above purpose is achieved by a method for extracting microvesicles from a biological sample according to the present disclosure, the method comprising: adding a polyvalent cationic substance to the biological sample to form an aggregate in which the microvesicles and the polyvalent cationic substance are aggregated with other via an electrical force; passing the biological sample containing the aggregate through a capture filter while the aggregate is captured by the capture filter; and passing an elution solution through the capture filter where the aggregate is captured such that the microvesicles are separated from the aggregate, and then extracting the separated microvesicles.

Further, the above purpose is achieved by a method for extracting microvesicles from a biological sample according to the present disclosure, the method comprising: adding a polyvalent cationic substance to the biological sample to form an aggregate in which the microvesicles and the polyvalent cationic substance are aggregated with other via an electrical force; passing the biological sample containing the aggregate through a capture filter while the aggregate is captured by the capture filter; passing a buffer solution having a negative charge through the capture filter in which the aggregate is captured such that the aggregate is released from the capture filter; and injecting an elution solution into the aggregate released from the capture filter such that the microvesicles are separated from the aggregate, and then extracting the separated microvesicles.

In this connection, the polyvalent cationic substance may include poly lysine, polyarginine, poly histidine, protamine, cationic dextran, cationic dendrimer, cationic polysaccharide, poly amidoamine, polyethyleneimine, polyquaternium, or a combination thereof.

Further, the elution solution may contain a chaotropic agent or protease.

The biological sample may include blood, plasma, serum, urine, saliva, cerebrospinal fluid, tear, sweat, feces, ascites, amniotic fluid, semen, milk, cell medium, tissue extract or cancer tissue.

The chaotropic agent may include a salt including guanidinium ion, n-butanol, ethanol, lithium perchlorate, lithium acetate, magnesium chloride, phenol, 2-propanol, sodium dodecyl sulfate, thiourea, urea, or a combination thereof.

Further, the protease may include proteinase K, pepsin, trypsin or chymotrypsin.

Further, the capture filter may have pores of a size capable of capturing the aggregate.

In this connection, the capture filter may include at least one of: a membrane having pores defined therein; or a bead packing filter in which a plurality of micro-beads are closely packed in a 3 dimensional manner so that pores are formed therein.

Further, the capture filter may be made of a hydrophilic material or a cation exchange resin.

Moreover, the capture filter may be made of a hydrophilic material or a cation exchange resin so that the aggregate is captured in the capture filter via an electric force, wherein the buffer solution contains at least one of $Ca^{2+}$, $Mg^{2+}$, $Na^+$, $K^+$, $NH^{4+}$ ions, or a combination thereof.

Technical Effect

According to the present disclosure, a method for extracting microvesicles from a biological sample may be realized in which the method may extract microvesicles using a polyvalent cationic substance without a centrifugation process.

BRIEF DESCRIPTION OF DRAWINGS

FIG. 1 is a diagram to illustrate a method for extracting microvesicles from a biological sample according to the present disclosure.

FIG. 2 to FIG. 4 are diagrams to illustrate implementations of a method for extracting microvesicles from a biological sample according to the present disclosure.

FIG. 5 shows a size and a shape of a microvesicle aggregate generated and a microvesicle isolated according to a microvesicle extraction method according to the present disclosure.

FIG. 6 shows a size and a shape of a microvesicle extracted via a present example and a comparative example of the present disclosure.

FIG. 7 shows results of measuring protein markers and RNA in microvesicles extracted according to a present example and a comparative example.

FIG. 8 shows a zeta potential measurement result for a component in a biological sample.

FIG. 9 shows a microvesicle aggregate formation result according to a polyvalent cationic substance concentration.

FIG. 10 shows a microvesicle aggregate formation result according to an incubation time and an incubation temperature.

FIG. 11 shows a size and a yield of microvesicles based on a concentration of a chaotropic agent in an elution solution.

FIG. 12 shows an amount of protein impurities and an amount of microvesicles based on a concentration of a chaotropic agent in a washing solution.

FIG. 13 shows a microvesicles aggregate isolation amount based on an amount of protease in the elution solution.

BEST MODE

Hereinafter, embodiments according to the present disclosure will be described in detail with reference to the accompanying drawings.

In accordance with the present disclosure, the term "microvesicle" is used synonymously with an extracellular vesicle released from a cell membrane of Archaea, Prokarya, or Eukarya. In accordance with the present disclosure, the microvesicle may include exosomes, argosomes, dexosomes, ectosomes, exovesicle, oncosome, prominosome, prostasome, tolerosome, microparticle, nanovesicle, blebbing vesicle, budding vesicle, exosome-like vesicle, matrix vesicle, membrane vesicle, shedding vesicle, membrane particle, shedding microvesicle, membrane bleb, epididimosome, prominosome, texosome or archeosome, but may not be limited thereto.

FIG. 1 is a diagram to illustrate a method for extracting microvesicles from a biological sample according to the present disclosure. FIG. 2 is a diagram showing an implementation of a method for extracting microvesicles from a biological sample according to the present disclosure.

Referring to FIG. 1 and FIG. 2, the method for extracting microvesicles in accordance with the present disclosure may include add a polyvalent cationic substance 12 to a biological sample containing microvesicles 11 S10. In accordance with the present disclosure, the biological sample may include a cell culture solution, a tissue sample, etc. containing microvesicles. Specifically, the biological sample may include animal, plant or microorganism-derived cell medium, tissue extract, cancer tissue, blood, plasma, serum, urine, saliva, cerebrospinal fluid, tears, sweat, feces, ascite, amniotic fluid, semen, or milk, but may not be limited thereto.

The microvesicles 11 have electrically negative (−) properties. Thus, when the polyvalent cationic substance 12 is added to the biological sample, the polyvalent cationic substance 12 and the microvesicles 11 are aggregated with each other via an electrical force, thereby forming an aggregate 10 as shown in (a) of FIG. 2 S11.

In accordance with the present disclosure, the polyvalent cationic substance includes a cationic polymer. Specifically, the polyvalent cationic substance may include polylysine (which may be available in a form of a salt such as poly-L-lysine hydrobromide or poly-L-lysine hydrochloride), polyarginine, poly histidine, protamine (which may be available in a form of a salt such as protamine chloride or protamine sulfate), cationic dextran, cationic dendrimer, cationic polysaccharide, polyamidoamine, polyethyleneimine, polyquaternium, or a combination thereof. However, the present disclosure is not limited thereto. In one embodiment, the polyvalent cationic substance may be a polylysine salt.

In an embodiment of the present disclosure, the polyvalent cationic substance employed poly-L-lysine (PLL) having a molecular weight of 150 to 300 kD at a concentration of 0.02 to 2.00 mg/mL (present example 1).

As described above, a size of each of the microvesicles 11 is in a range of nanometers. Thus, it is difficult to extract the microvesicles 11. In accordance with the present disclosure, the microvesicles 11 having the electrical negative (−) property are aggregated with the polyvalent cationic substance 12 via the electrical force to form the aggregate having an increased size, which may be easily captured.

In this connection, an incubation process for aggregation between the polyvalent cationic substance 12 and the microvesicles 11 is carried out for a certain period of time and under a certain temperature condition.

In one embodiment, the incubation process may be performed under a temperature condition of 0.1 to 40° C., preferably, lower than 25° C. For example, the incubation process may be performed at a temperature lower than 20° C., or lower than 15° C., or lower than 12° C., or lower than 10° C. For example, the process may be performed under a temperature condition of 1 to 8° C.

In one embodiment, the incubation process may be performed for 0.5 to 100 minutes, preferably for a time duration smaller than 30 minutes. For example, the incubation process may be performed for a time duration smaller than 25 minutes, or smaller than 20 minutes, or smaller than 15 minutes. For example, the process may be performed for 5 to 15 minutes.

In an embodiment of the present disclosure, it was identified that the microvesicle aggregates were effectively formed when the incubation process was performed at 4° C. for 10 minutes (FIG. 10).

In this connection, the incubation time duration for the aggregation may be determined experimentally. A time required for the aggregation using the electrical force may be significantly reduced, compared to a time required in the conventional immunoaffinity isolation method.

In accordance with the present disclosure, the polyvalent cationic substance 12 employs poly lysine salt, poly arginine, poly histidine salt, protamine chloride, protamine sulfate, cationic dextran, cationic dendrimer, cationic polysaccharide, poly amidoamine, polyethylenimine or polyquaternium, or combinations thereof.

As described above, the polyvalent cationic substance 12 and the microvesicles 11 in the biological sample are aggregated with each other to form the aggregate 10. Thus, when the biological sample passes through a capture filter 120, the aggregate 10 may be captured by the capture filter 120 S12.

In accordance with the present disclosure, as shown in (b) of FIG. 2, the biological sample passes through the capture filter 120 installed inside an extraction tube 110 by gravity or a negative pressure by way of example.

Further, in an embodiment shown in FIG. 2, the capture filter 120 has pores of a size capable of capturing the aggregate 10. For example, the capture filter 120 may be embodied as a membrane in which the pores are formed, or a bead packing filter in which a plurality of micro-beads are closely packed in a 3D manner so as to form the pores.

The capture filter may have the pores of a size capable of capturing the microvesicle aggregates therein. The size of the pores formed in the capture filter may be set to a size in which the microvesicle aggregate cannot escape from the capture filter. Further, the pore may be sized such that when the aggregate is disaggregated by the elution solution in a subsequent elution step, the separated microvesicle may flow through the pore. In one embodiment, the size of the pore in the capture filter may be in a range of 50 nm to 1,000 nm, specifically 100 nm to 500 nm, and more specifically 150 nm to 300 nm.

A surface portion of the capture filter in contact with the microvesicle aggregate may be embodied as a membrane, a bead, a column, or a combination thereof. In one embodiment, the capture filter may be provided in a form of a pore-formed membrane or a bead packing filter in which a plurality of micro-beads are closely packed to each other so as to form pores.

In this connection, the capture filter 120 may be made of a hydrophilic material or a cation exchange resin so that the aggregate 10 having a positive electrical characteristic is more easily captured therein.

When the capture filter is made of a hydrophilic material, the microvesicle aggregate may be easily caught in the pores and physically captured. The hydrophilic material may include sliver metal, polyethersulfone, glass fiber, polycarbonate track etch (PCTE), polyester, mixed cellulose esters (MCE), nylon, cellulose acetate, or combinations thereof.

When the capture filter is made of the cation exchange resin, the microvesicle aggregates are adsorbed on the filter surface of the negatively charged capture filter via the electrical force. The cation exchange resin may include carboxymethyl, methyl sulfonate, a sulphonyl group, or combinations thereof.

An embodiment shown in (b) of FIG. 3 shows an example of a capture filter 120a made of the cation exchange resin having a negative charge which may capture the aggregate 10 using an electrical force.

That is, in accordance with the present disclosure, a manner in which the aggregate 10 is captured by the capture filter 120 in which pores are formed and/or a manner in which the aggregate 10 is captured by the capture filter 120 made of the cation exchange resin having a negative charge via an electrical force may be employed. Thus, the nanometer-scale microvesicles 11 may be aggregated with the polyvalent cationic substance 12 to form the aggregate 10 which may be easily caught in the pores or easily captured using the electrical force.

In an embodiment of the present disclosure, the microvesicle aggregate was filtered using a syringe filter having a pore size of about 220 nm (present example 1).

As described above, while the aggregate 10 is captured by the capture filter 120, an extraction process of the microvesicles 11 using the elution solution is performed S13 and S14. In this connection, in accordance with the present disclosure, before proceeding with the extraction process of the microvesicles 11 using the elution solution, a washing solution may pass through the capture filter 120 to wash the capture filter 120. This may remove residues such as EVs collected on the microvesicles 11 in addition to the aggregate 10. Thus, a purity of eventually extracted microvesicles 11 may be improved.

In accordance with the present disclosure, the washing solution may contain a chaotropic agent to be described later. In this case, the chaotropic agent contained in the washing solution is preferably contained at a lower concentration than that of the chaotropic agent contained in the elution solution. For example, when the elution solution contains a salt including guanidinium ions as a chaotropic agent, the washing solution may also contain a salt including guanidinium ions as a chaotropic agent. In this case, the concentration of the chaotropic agent contained in the washing solution is lower than the concentration of the chaotropic agent contained in the elution solution. For example, the former may be in a range of 0.1 to 4.5 M, 0.5 to 4 M, and 1 to 3 M. In one embodiment of the present disclosure, the captured microvesicle aggregate was washed using the washing solution containing guanidium thiocyanate at 0 to 2 M concentration (FIG. 12).

The washing solution may contain an appropriate salt to effectively wash impurities. In one embodiment, the salt may contain monovalent cations such as $NH_{4+}$, $Na^+$, and $K^+$, divalent cations such as $Ca^{2+}$, $Mg^{2+}$, or combinations thereof. For example, the salt in the washing solution may be $(NH_4)_2SO_4$, $Na_2SO_4$, NaCl, KCl, $CH_3COONH_4$, or a combination thereof. The salt may be contained in the washing solution at a concentration lower than a certain concentration, for example, lower than 10 mM.

When the washing process is completed, the elution solution may pass S13 through the capture filter 120 where the aggregate 10 is captured to isolate the microvesicles 11 from the aggregate 10 and may extract the microvesicles 11 S14.

In accordance with the present disclosure, the elution solution may contain a chaotropic agent or protease.

In accordance with the present disclosure, the chaotropic agent refers to a substance or an ion that destabilizes or destroys a cargo structure of a water molecule in a water solution. Due to the addition of the chaotropic agent into the water solution, an entropy of water is increased to affect a force between proteins, hydrogen bond, Van der Waals force, or hydrophobic bond. Thus, a molecular structure thereof is destabilized.

The chaotropic agent may include a salt containing guanidinium ion, such as guanidinium isothiocyanate, guanidinium thiocyanate, guanidinium chloride, or guanidine hydrochloride; n-butanol, ethanol, lithium perchlorate, lithium acetate, magnesium chloride, phenol, 2-propanol, sodium dodecyl sulfate, thiourea, urea, or a combination thereof, but may be not limited thereto.

In one embodiment, the chaotropic agent according to the present disclosure includes guanidinium thiocyanate (GuTc) which may be contained in the elution solution at a concentration of 1 to 9 M, specifically 2 to 8 M, more specifically 3 to 7 M, or 4 to 6 M.

The protease may include proteinase K, pepsin, trypsin or chymotrypsin.

The elution solution as described above may remove the electrical bond between the microvesicles 11 and the polyvalent cations constituting the aggregate 10 to isolate the microvesicles 11 from the aggregate 10, thereby enabling extraction of the microvesicles 11. That is, isolating the microvesicles 11 from the aggregate 10 using the elution solution may allow eliminating a centrifugal process for extracting the microvesicles 11. Thus, the microvesicles 11 may be extracted at a lower cost and for a smaller time duration, compared to the conventional method using the centrifugal separator.

In one example, FIG. 4 is a diagram showing another implementation of a method for extracting microvesicles from a biological sample according to the present disclosure. In an embodiment shown in FIG. 4, as shown in (b) of FIG. 4, the capture filter 120a is made of a hydrophilic material or a cation exchange resin. Thus, the aggregate 10 is captured by the capture filter 120a using the electrical force.

Further, when the capture step and the washing step are completed as in the above embodiment, a buffer solution having a negative charge may pass through the capture filter 120a in which the aggregate 10 is captured, such that aggregate 10 is released from the capturer filter 120a, as shown in (c) of FIG. 4. Then, the elution solution may be injected to the aggregate 10 isolated from the capture filter 120a as in the above embodiment, such that the microvesicles 11 are isolated from the aggregate 10 to extract the microvesicles 11. In accordance with the present disclosure, the buffer solution may contain at least one of $Ca^{2+}$, $Mg^{2+}$, $Na^+$, $K^+$, $NH^{4+}$ ions, or a combination thereof by way of example.

FIG. 5 to FIG. 13 is a diagram to illustrate an experimental example of a method for extracting microvesicles 11 from a biological sample according to the present disclosure. This experimental example uses plasma as the biological sample. In this experimental example, poly-L-lysine solution is used as the polyvalent cationic substance 12. The microvesicles 11 and the polyvalent cationic substance 12 are aggregated with each other to form the aggregate 10. This experimental example will be described below.

FIG. 5 shows that a size of the aggregate 10 is significantly increased compared to a size of the microvesicle 11 according to an embodiment.

FIG. 6 shows that an extraction yield and a purity of microvesicles 11 using the method according to an embodiment of the present disclosure are improved, compared to the comparative example method used in the prior art.

FIG. 7 shows that biomarkers of extracellular vesicles (EVs) are well expressed in the microvesicles 11 extracted according to an embodiment of the present disclosure, and thus are usefully used for analysis such as subsequent molecular diagnosis.

Based on FIG. 9, it is identified that when 0, 0.10 mg/mL, 0.25 mg/mL, 0.50 mg/mL, 1.0 mg/mL, 5.0 mg/mL of the polyvalent cationic substance 12 was added respectively, the aggregate 10 was formed on a bottom.

FIG. 10 shows an optimum temperature and time required for the formation of the aggregate 10 of the microvesicles 11.

FIG. 13 shows the results of an experiment on whether the aggregate 10 is decomposed and resuspended after adding a poly-L-lysine solution to plasma to form the aggregate 10, and then adding proteinase K as an elution solution thereto. In this experiment, 0.25 mg/mL of poly-L-lysine solution was added, and 100 μl, 200 μl and 300 μl of proteinase K was added by way of example. As shown in FIG. 13, it was identified that the aggregate 10 was decomposed and resuspended.

(a) in FIG. 11 shows the result of the experiment whether the aggregate 10 is decomposed and resuspended after adding poly-L-lysine solution to plasma to form the aggregate 10 and then adding guanidinium thiocyanate solution as an elution solution thereto. In an order from a left to a right of (a) in FIG. 11, distilled water, 1M, 2M, 3M, and 4M guanidinium thiocyanate solutions were added. It may be seen that the resuspension level of the aggregate improves as the concentration of the solution increases.

(b) in FIG. 11 is a diagram showing the results of checking the size of particles in the resuspended solution in (a) in FIG. 11 using a nanoparticle tracking analysis device. As shown in (b) of FIG. 11, it may be seen that as the concentration of the solution increases, the aggregate 10 is resuspended and thus the particle size decreases as the concentration increases. In (c) in FIG. 11, it may be seen that the concentration of the solution containing the resuspended aggregate in (a) in FIG. 11 increases as the concentration of the guanidinium thiocyanate solution increases.

FIG. 12 shows the measurement of protein impurities and microvesicles based on a concentration of the chaotropic agent GuTc in the washing solution. It was confirmed based on FIG. 12 that the washing process proceeded efficiently using GuTc at a concentration of 2M.

EXAMPLES

Hereinafter, the present disclosure will be described in more detail based on examples. These examples are only for illustrating the present disclosure, and it will be apparent to those of ordinary skill in the art that the scope of the present disclosure is not to be construed as being limited by these examples.

Preparation of Biological Samples

This study was conducted after obtaining consent from institutional review board of Korea University Anam Hospital (IRB Project No.: 2016AN0090) and all applicants of blood samples. Blood samples were taken from a median cubital vein of each applicant and collected in a 3 mL K2-EDTA vacutainer (Becton Dickinson, USA). The whole blood was centrifuged at 1900 g for 10 minutes and then centrifuged at 12,000 g for 15 minutes to isolate plasma. Then, the plasma was filtered through a mesh of 800 nm pore size to remove large debris. 1 mL of each plasma sample was prepared.

Present Example 1

Isolation of Extracellular Vesicles Via Aggregation Using Cationic Polymer and Elution Using Chaotropic Agent A cationic polymer was added to the prepared plasma sample to induce aggregation between extracellular vesicles and the polymer via interaction between charges. Aggregates with a size of several hundred nanometers were formed. Poly-L-lysine (PLL, Sigma-Aldrich, USA) having a molecular weight of 150 to 300 kDa was used as the cationic polymer. After preparing a PLL stock solution at a concentration of 10 mg/mL, we additionally added the stock solution thereto, such that a final PLL concentration (0.02 to 2.00 mg/mL) in each plasma sample was adjusted. We carefully considered the yield and purity of the isolated extracellular vesicle, and then adjusted the final PLL concentration to 0.5 mg/mL. A mixture of plasma and PLL solution was incubated at 4° C. for 10 minutes. After the incubation, the mixture was filtered using a syringe filter having a pore size of 220 nm. After the filtration, large aggregated particles were left in the filter.

To obtain the extracellular vesicles from the aggregate having PLL, 2 mL of washing buffer (GuTc, 2M) and 200 μL of elution buffer (GuTc, 5M) were used on the same mesh. Washing was performed by flowing washing buffer to the aggregated protein. Then, the extracellular vesicle was isolated using the GuTc solution, and PLL polymer and plasma proteins were removed therefrom.

In order to identify the obtained extracellular vesicles, SEM images (Quanta 250 FEG; FEI, USA) were photographed and analyzed.

Comparative Example 1

Isolation of Extracellular Vesicles Using Ultracentrifugation

An ultracentrifugation (UC) method is a standard method that has traditionally been widely used for the isolation of extracellular vesicles. Although the UC isolation protocol is simple, it is time consuming (over 6 hours) and has the disadvantage of being labor-intensive. Plasma and PBS were mixed with each other in a 1:1 ratio. The mixture was centrifuged to remove residual cellular components (4° C., 12,000 g, 30 min). The supernatant was transferred and centrifugation was repeated thereon once under the same conditions. The supernatant was filtered using a syringe filter (Merck Millipore, USA) having a 200 μm pore size, followed by ultracentrifugation at 120,000 g and 4° C. for 2 hours (CP100WX; Hitachi, Japan). After aspirating the supernatant, bottom pellets were carefully washed with PBS at 120,000 g and 4° C. for 1 hour, and then were resuspended in 50 μL of PBS.

Comparative Example 2

Isolation of Extracellular Vesicles Using Commercialized PEG Solution Inducing Extracellular Vesicle Precipitation ExoQuick™ exosome precipitation solution (EXOQ5A-1, System Biosciences, USA) as a representative product that was commercialized for extracellular vesicle isolation was used. A standard protocol may refer to the ExoQuick user manual.

Briefly, plasma samples were mixed with ExoQuick solution as a PEG-based solution, and then the mixture was incubated at 4° C. for 30 minutes. After the incubation, the mixture was centrifuged at 1,500 g for 30 min. The supernatant was carefully aspirated, leaving pellets on the bottom. Further centrifugation at 1,500 g for 5 minutes was performed, and then, the ExoQuick solution was completely removed. The remaining pellets were then resuspended in 200 μL of PBS.

Comparative Example 3

Extracellular Vesicle Isolation Using Commercialized Spin Column

As another extracellular vesicle isolation method, an exoEasy™ method using a commercialized spin column-type extracellular vesicle isolation kit that utilizes the electrical interaction between the membrane and the extracellular vesicle was carried out.

Experimental Example 1

Measurement of Particle Size of Microvesicle Aggregate

The particle diameter according to Present present example 1 was measured using the dynamic light scattering method (DLS). As a result, it was identified that the extracellular vesicle aggregate (600 nm) has a significantly larger size than that of the extracellular vesicle (200 nm). The results indicate that the extracellular vesicles were aggregated with PLL. The isolated extracellular vesicles and the extracellular vesicles aggregated with PLL were also visualized using SEM. In the aggregated extracellular vesicle, the extracellular vesicle was completely surrounded with polymer. A size of the extracellular vesicle and a size of the extracellular vesicle aggregate were identified as 171 nm and 815 nm, respectively (FIG. 5).

Experimental Example 2

Comparison Between Microvesicle Sizes Based on Types of Microvesicle Extraction Methods The yield, size, and purity of extracellular vesicles isolated from plasma by applying the method of the present example 1 were compared with those of the comparative examples 1, 2, and 3. Comparative example 2 was based on a polymer (PEG)-based precipitation and isolation method for extracellular vesicles, and the comparative example 3 was based on a method using a spin column-type extracellular vesicle isolation kit utilizing the electrical interaction between the extracellular vesicle and the membrane. The size distribution of extracellular vesicles was measured based on nanoparticle tracking analysis (NTA) (Malvern Panalytical, USA). The shape and size thereof were identified using cryo-TEM (TecnaiG2-F20,FEI,USA).

The extracellular vesicle isolated using the comparative example 1 had the size distribution of about 20 to 130 based on a result of SEM measurement, whereas the extracellular vesicle isolated using ExoCAS had the size distribution of 30 to 100 nm based on a result of SEM measurement ((d) and (e) in FIG. 6).

Further, the TEM image morphology of the extracellular vesicle isolated according to the present example 1 was compared with that of the extracellular vesicle isolated using the comparative example 1. As a result, in both methods, a clear morphology was observed in vesicles with a diameter of 100 to 200 nm ((d) and (e) in FIG. 6). Moreover, no significant difference was found between the TEM images of the comparative example 1 and the present example 1.

In the analysis of extracellular vesicle recovery, it was identified that both methods of the comparative example 2 and the present example 1 had high yields of $41 \times 10^{10}$/mL and $61 \times 10^{10}$/mL, respectively, whereas the methods of the comparative example 1 and the comparative example 3 have relatively low yields, respectively, of $3.8 \times 10^{10}$/mL and $9 \times 10^{10}$/mL. It was identified that the present example 1 had 6 to 17 times higher extracellular vesicle yield that that of each of the comparative examples 1 and 3 ((b) in FIG. 6).

Among parameters for evaluating extracellular vesicle isolation performance, protein contamination which determines the quality of subsequent analysis is also important. That is, the protein amount in the elution buffer should be minimized, while the extracellular vesicle therein should be concentrated at high concentration. According to BCA protein assay method (#23225; Thermo Scientific, USA), the protein contamination levels based on different extracellular vesicle isolation methods were measured. The tested sample was a final eluent as obtained in each method. The amounts of residual proteins in the comparative example 1, the comparative example 3 and the present example 1 were 232 µg/mL, 301 µg/mL, and 041 µg/mL, respectively, whereas that of the comparative example 2 was significantly higher (33,730 µg/mL) ((a) in FIG. 6).

The purity ratio represents the number of isolated particles relative to the protein concentration. The comparative example 1 based on the UC method showed a purity ratio of 1.0, the comparative example 2 showed the purity ratio of 0.1, and the comparative example 3 showed a purity ratio of 1.8 whereas the present example 1 showered a significantly higher purity ratio of 3.5 ((c) in FIG. 6).

Experimental Example 3

Comparison Between Extracellular Vesicle Isolation Performances based on Protein Marker and Micro RNA The protein markers of extracellular vesicles isolated from three different methods (present example 1, comparative example 1, and comparative example 3) were measured using Western blotting. It is known that exosomes contain protein markers such as Alix (ALG-2-interacting protein X), TSG101 (tumor susceptibility gene 101 protein), HSP70 (heat shock protein), and the tetraspanins CD63, CD81, and CD9. The present inventors analyzed the characteristics of the isolated extracellular vesicles using the four reference protein markers (ALIX, TSG101: inner protein markers; CD9, and CD81: surface protein markers) ((a) in FIG. 7).

A brief description of the Western blotting procedure is as follows: the protein samples were separated with gel electrophoresis using SDS-PAGE Mini-PROTEAN® TGX™ Precast Gel (456-1035; Bio-rad, USA) Immunoblotting was performed thereon using rabbit polyclonal antibodies (1:2,000 dilution) anti-CD9 (ab92726), anti-CD81 (ab109201), anti-ALIX (ab186429), anti-TSG101 (ab125011), and goat anti-rabbit IgG H&L (HRP) (ab205718) (Abcam, Cambridge, UK). Protein bands were analyzed using enhanced chemiluminescence (ECL) solution and ChemiDoc™ XRS+ System (Bio-Rad, USA).

Based on a result of Western blotting for the marker, the total level of the protein marker may be measured from the intensity of the protein band ((b) and (c) in FIG. 7). The level of the exosome protein marker was as follows: present example 1>comparative example 3>comparative example 1.

Briefly describing the RNA extraction and quantification process, RNA was isolated using seraMir Exosome RNA purification kit (RA806A-1, SBI, USA). All isolation procedures were performed according to the manufacturer protocol. To quantify EV miRNA markers, reverse transcription of RNA eluates was performed using TaqMan MicroRNA RT Kit (4366596, Life Technologies, USA) and TaqMan Micro RNA Assay (4427975, Life Technologies, USA). In this process, TaqMan Universal Master Mix II, no UNG (4440040, Life Technologies, USA) and miRNA assays hsa-let-7a-5p, ID 000377, and hsa-miR-142-3p, ID 000464 were used. Additional experiments were performed on the RNA eluate using an Agilent Eukaryote Total RNA Pico chip and on an Agilent 2100 bioanalyzer (Agilent Technologies, USA).

Based on a result of extracting the total RNA and comparing the amount thereof, the RNA amount was as follows: present example 1>comparative example 3>comparative example 1>comparative example 2 ((d) in FIG. 7).

The results indicate that the PLL aggregation method yields the microvesicle containing more abundant RNA, compared to other extracellular vesicle isolation methods. Further, based on a result of RT-qPCR experiments using hsa-let-7a-5p and hsa-miR-142-3p as known miRNA markers of extracellular vesicles, the PLL aggregation method showed a similar Ct value compared to that of the UC method ((e) in FIG. 7).

Experimental Example 4

Formation of Extracellular Vesicle Aggregates Derived from Cationic Polymers Brief description of the zeta potential analysis method of extracellular vesicles and polycationic polymers is as follows: the zeta potentials for extracellular vesicles isolated according to the comparative example 1, PLL solution (10 mg/mL), and PLL and extravesicular vesicle aggregates were measured using a zeta potential analyzer (Zetasizer Pro; Malvern Panalytical; UK). Since it is difficult to resuspend the aggregates in deionized water, the aggregated pellets (PLL 0.5 mg/mL) from 1 mL of plasma were first resuspended in 10 μL of GuTc solution (10 M), and then 990 μL of deionized water was added to the solution. The mixture was carefully dispersed for 5 minutes using a vortex mixer.

The result is shown in (a) of FIG. 8.

The extracellular vesicle exhibits a negative charge of −19.7 mV, whereas the PLL solution (10 mg/mL) exhibits a strong positive charge zeta potential of 42.4 mV. When the extracellular vesicle was bound to the PLL polymer, the zeta potential of the extracellular vesicle-PLL aggregate was neutralized to −5.6 mV. The results indicate a strong electrostatic interaction between the negative charge of the extracellular vesicle and the positive charge of the PLL polymer. Albumin showed a weak negative charge, whereas n-globulin showed a pharmacologically positive charge. In one example, fibrinogen exhibits a negative charge of −18.7 mV similar to that of the extracellular vesicles, and thus strongly interacts with cationic PLL ((a) and (b) in FIG. 8 and FIG. 9).

After understanding the zeta potentials of plasma proteins and PLL, the present inventors investigated the possibility of aggregate formation of extracellular vesicle-deficient plasma when adding the PLL solution thereto ((d) in FIG. 8). Despite the absence of extracellular vesicles, relatively weak aggregate formation was found, compared to control plasma. Therefore, the present inventors further investigated the aggregate formation of extracellular vesicle-deficient serum using serum (fibrinogen-free) and PLL ((e) and (f) in FIG. 8). Surprisingly, no apparent aggregate formation was observed. The results show that plasma proteins and PLL are aggregated with each other via electrical interaction, and fibrinogen is the main protein that is aggregated with PLL.

Next, the effect of the incubation temperature on the formation of extracellular vesicle-PLL aggregate was investigated. The plasma-PLL polymer mixture was incubated at 4° C. and 25° C. for 10 minutes, respectively, and then was centrifuged. Extracellular vesicle aggregation occurred much more efficiently at 4° C. than at 25° C. (FIG. 10). As the PLL concentration increased, the size and shape of the pellets also increased, and the pellets became clearer ((b) in FIG. 8 and FIG. 9).

Experimental Example 5

Resuspension of Extracellular Vesicles from Aggregate

Extracellular vesicle aggregates were successfully obtained by simply adding PLL solution to plasma. For isolation of extracellular vesicles for subsequent application, resuspension of extracellular vesicle aggregates in an appropriate buffer was required. However, strongly aggregated polymers and extracellular vesicles could not be suspended in deionized water or PBS solution ((a) in FIG. 11). Therefore, the chaotropic agent (GuTc) was used for dissolution of PLL and extracellular vesicle precipitates. The dissolution ability of the extracellular vesicle-PLL aggregate based on various concentrations of GuTc solution (0 to 4 M) was measured.

The size and particle concentration of isolated extracellular vesicles based on GuTc concentrations were analyzed using NTA ((b) and (c) in FIG. 11). As the concentration of the GuTc solution increased, the size of the extracellular vesicles gradually decreased. At low concentrations of GuTc (1M and 2M), larger particles were observed (about 300 nm). At 1M GuTc, the extracellular vesicle concentration was very low ($0.03 \times 10^{10}$). On the other hand, at high concentration of GuTc (4M), a peak value of the particle size significantly decreased to 102 nm. Thus, the extracellular vesicle was considered to be completely released from the aggregate. At a fixed PLL concentration (0.2 mg/mL) in plasma, 4 M GuTc solution among various concentration solutions showed the best aggregate-dissolving effect. The optimized GuTc buffer successfully dissolved the extracellular vesicle aggregate pellets within 1 minute.

From a result of measuring the amounts of protein impurities and microvesicles based on the concentration of the chaotropic agent (GuTc) in the washing solution, it was identified that the highest purity (particle/protein concentration) was obtained in the washing process using 2M GuTc (FIG. 12).

The dissolution of the extracellular vesicle aggregate pellets was observed when protease K was contained in the elution solution (FIG. 13).

Although several examples of the present disclosure have been shown and described, it will be appreciated by those of ordinary skill in the art to which the present disclosure pertains that modifications may be made to this example without departing from the principle or spirit of the present disclosure. The scope of the present disclosure will be defined by the appended claims and their equivalents.

REFERENCE NUMERALS

10: Aggregate 11: Microvesicles
12: Polyvalent cationic substance 110: Extraction tube
120, and 120a: Capture filter

INDUSTRIAL APPLICABILITY

The method according to the present disclosure may extract the microvesicles from the biological sample using the polyvalent cationic substance without the centrifugation process and thus may be useful in various industrial fields where the microvesicles are utilized.

What is claimed is:

1. A method for extracting microvesicles from a biological sample, the method comprising:
    adding a polyvalent cationic substance to the biological sample to form multiple aggregates in which the microvesicles and the polyvalent cationic substance are aggregated with other via an electrical force;
    passing the biological sample containing the aggregates through a capture filter while the aggregates are captured by the capture filter;
    passing an elution solution through the capture filter where the aggregates are captured such that the microvesicles are separated from the aggregates, and then extracting the separated microvesicles,
    wherein the polyvalent cationic substance comprises polyarginine, polyhistidine, cationic dendrimer, polyamidoamine, polyquaternium, or a combination thereof.

2. A method for extracting microvesicles from a biological sample, the method comprising: adding a polyvalent cationic substance to the biological sample to form multiple aggregates in which the microvesicles and the polyvalent cationic substance are aggregated with other via an electrical force; passing the biological sample containing the aggregates through a capture filter while the aggregates are captured by the capture filter; passing a buffer solution having a negative charge through the capture filter in which the aggregates are captured such that the aggregates are released from the capture filter; and injecting an elution solution into the aggregates released from the capture filter such that the microvesicles are separated from the aggregates, and then extracting the separated microvesicles, wherein the capture filter comprises a hydrophilic material selected from the group consisting of sliver metal, polyethersulfone, glass fiber, polycarbonate track etch (PCTE), and mixed cellulose esters, and wherein the polyvalent cationic substance comprises polyarginine, poly histidine, cationic dendrimer, poly amidoamine, polyquaternium, or a combination thereof.

3. The method of claim 1, wherein the elution solution contains a chaotropic agent or protease.

4. The method of claim 1, wherein the biological sample comprises blood, plasma, serum, urine, saliva, cerebrospinal fluid, tear, sweat, feces, ascites, amniotic fluid, semen, milk, cell medium, tissue extract or cancer tissue.

5. The method of claim 3, wherein the chaotropic agent comprises a salt comprising guanidinium ion, n-butanol, ethanol, lithium perchlorate, lithium acetate, magnesium chloride, phenol, 2-propanol, sodium dodecyl sulfate, thiourea, urea, or a combination thereof.

6. The method of claim 3, wherein the protease comprises proteinase K, pepsin, trypsin or chymotrypsin.

7. The method of claim 1, wherein the capture filter has pores of a size capable of capturing the aggregates.

8. The method of claim 7, wherein the capture filter comprises at least one of:
a membrane having pores defined therein; or
a bead packing filter in which a plurality of micro-beads are closely packed in a 3 dimensional manner so that pores are formed therein.

9. The method of claim 7, wherein the capture filter is made of a hydrophilic material or a cation exchange resin.

10. The method of claim 2, wherein the buffer solution contains at least one of $Ca^{2+}$, $Mg^{2+}$, $Na^+$, $K^+$, $NH^{4+}$ ions, or a combination thereof.

11. The method of claim 2, wherein the elution solution comprises a chaotropic agent or protease.

12. The method of claim 2, wherein the biological sample comprises blood, plasma, serum, urine, saliva, cerebrospinal fluid, tear, sweat, feces, ascites, amniotic fluid, semen, milk, cell medium, tissue extract or cancer tissue.

13. The method of claim 11, wherein the chaotropic agent comprises a salt comprising guanidinium ion, n-butanol, ethanol, lithium perchlorate, lithium acetate, magnesium chloride, phenol, 2-propanol, sodium dodecyl sulfate, thiourea, urea, or a combination thereof.

14. The method of claim 11, wherein the protease comprises proteinase K, pepsin, trypsin or chymotrypsin.

15. The method of claim 2, wherein the capture filter has pores of a size capable of capturing the aggregates.

16. The method of claim 15, wherein the capture filter comprises at least one of:
a membrane having pores defined therein; or
a bead packing filter in which a plurality of micro-beads are closely packed in a 3 dimensional manner so that pores are formed therein.

* * * * *